(12) United States Patent
Favaretto (10) Patent No.: US 12,447,872 B2
(45) Date of Patent: Oct. 21, 2025

(54) MOTOR VEHICLE WITH SEAT ASSEMBLY DIVIDED INTO SEVERAL, SINGULARY ADJUSTABLE PORTIONS

(71) Applicant: FERRARI S.P.A., Modena (IT)

(72) Inventor: Fabrizio Favaretto, Modeno (IT)

(73) Assignee: FERRARI S.P.A., Modena (IT)

( * ) Notice: Subject to any disclaimer, the term of this patent is extended or adjusted under 35 U.S.C. 154(b) by 194 days.

(21) Appl. No.: 18/345,289

(22) Filed: Jun. 30, 2023

(65) Prior Publication Data

US 2024/0010105 A1    Jan. 11, 2024

(30) Foreign Application Priority Data

Jul. 8, 2022 (IT) .................... 102022000014446

(51) Int. Cl.
| | |
|---|---|
| *B60N 2/02* | (2006.01) |
| *B60N 2/00* | (2006.01) |
| *B60N 2/12* | (2006.01) |
| *B60N 2/16* | (2006.01) |
| *B60N 2/22* | (2006.01) |
| *B60N 2/23* | (2006.01) |
| *A47C 7/40* | (2006.01) |
| *B64D 11/06* | (2006.01) |

(52) U.S. Cl.
CPC ......... *B60N 2/2222* (2013.01); *B60N 2/0027* (2023.08); *B60N 2/0248* (2013.01); *B60N 2/0268* (2023.08); *B60N 2/0273* (2023.08); *B60N 2/12* (2013.01); *B60N 2/16* (2013.01); *B60N 2/23* (2013.01); *A47C 7/405* (2013.01); *B60N 2205/35* (2013.01); *B64D 11/0697* (2014.12); *B64D 11/0698* (2014.12)

(58) Field of Classification Search
CPC ...... B60N 2/0244; B60N 2/2209; B60N 2/02; B60N 2/38; B60N 2/283; B60N 2/2222; B60N 2002/0204–02204; B60N 2205/30; B60N 2205/35; A47C 7/405; B64D 11/0697; B64D 11/698
See application file for complete search history.

(56) References Cited

U.S. PATENT DOCUMENTS

| | | | |
|---|---|---|---|
| 9,802,513 B2 * | 10/2017 | Katoh | B60N 2/2222 |
| 10,293,718 B1 * | 5/2019 | Ilievski | B60N 2/0244 |
| 2009/0102264 A1 * | 4/2009 | Fischer | B60N 2/22 297/354.1 |

FOREIGN PATENT DOCUMENTS

| | | |
|---|---|---|
| JP | S61135835 A | 6/1986 |
| JP | H01144840 U | 8/1989 |

OTHER PUBLICATIONS

Italian Search Report for Application No. 102022000014446 Filing Date: Jul. 8, 2022; Date of Mailing—Feb. 22, 2023, 6 pages.

* cited by examiner

*Primary Examiner* — Syed A Islam
(74) *Attorney, Agent, or Firm* — CANTOR COLBURN LLP (57) ABSTRACT

A motor vehicle includes a structural element and a seat having at least two separate and independent seat portions, each of the seat portions being configured to support a part of a user's body and being independently coupled to the structural element in a movable manner relative to the structural element with three degrees of freedom including two translations in a plane along respective orthogonal axes and a rotation around a further axis orthogonal to said plane.

11 Claims, 7 Drawing Sheets

MOTOR VEHICLE WITH SEAT ASSEMBLY DIVIDED INTO SEVERAL, SINGULARLY ADJUSTABLE PORTIONS

CROSS-REFERENCE TO RELATED APPLICATIONS

This patent application claims priority from Italian patent application no. 102022000014446 filed on Jul. 8, 2022, the entire disclosure of which is incorporated herein by reference.

TECHNICAL FIELD

The invention relates to a motor vehicle, in particular a sports motor vehicle.

PRIOR ART

In some motor vehicles, at least one of the seats, for example the driver's seat, is adjustable or configurable.

In particular, a user, i.e., the person sitting in the seat, may adjust the height of the seat vertically, the longitudinal position of the seat, as well as the respective inclinations of the backrest and the base, i.e., the portion of the seat designed to support the lower limbs of the seated user.

Normally, the user uses a plurality of controls, such as levers or handles, to make possible adjustments.

The controls are typically located in respective distinct areas or positions that are typically reachable by the peripheral limbs, i.e., hands and feet, of the user sitting in the seat.

Generally, there is a need to improve the adjustment or configurability of known seats.

More specifically, there is a need to increase the versatility of the adjustment or the ergonomics of the seats.

Furthermore, there is also a need to simplify the operations necessary to configure or adjust the seats completely.

The object of the invention is to meet at least one of the above needs, preferably in a simple and reliable way.

DESCRIPTION OF THE INVENTION

The object is achieved by means of a motor vehicle as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
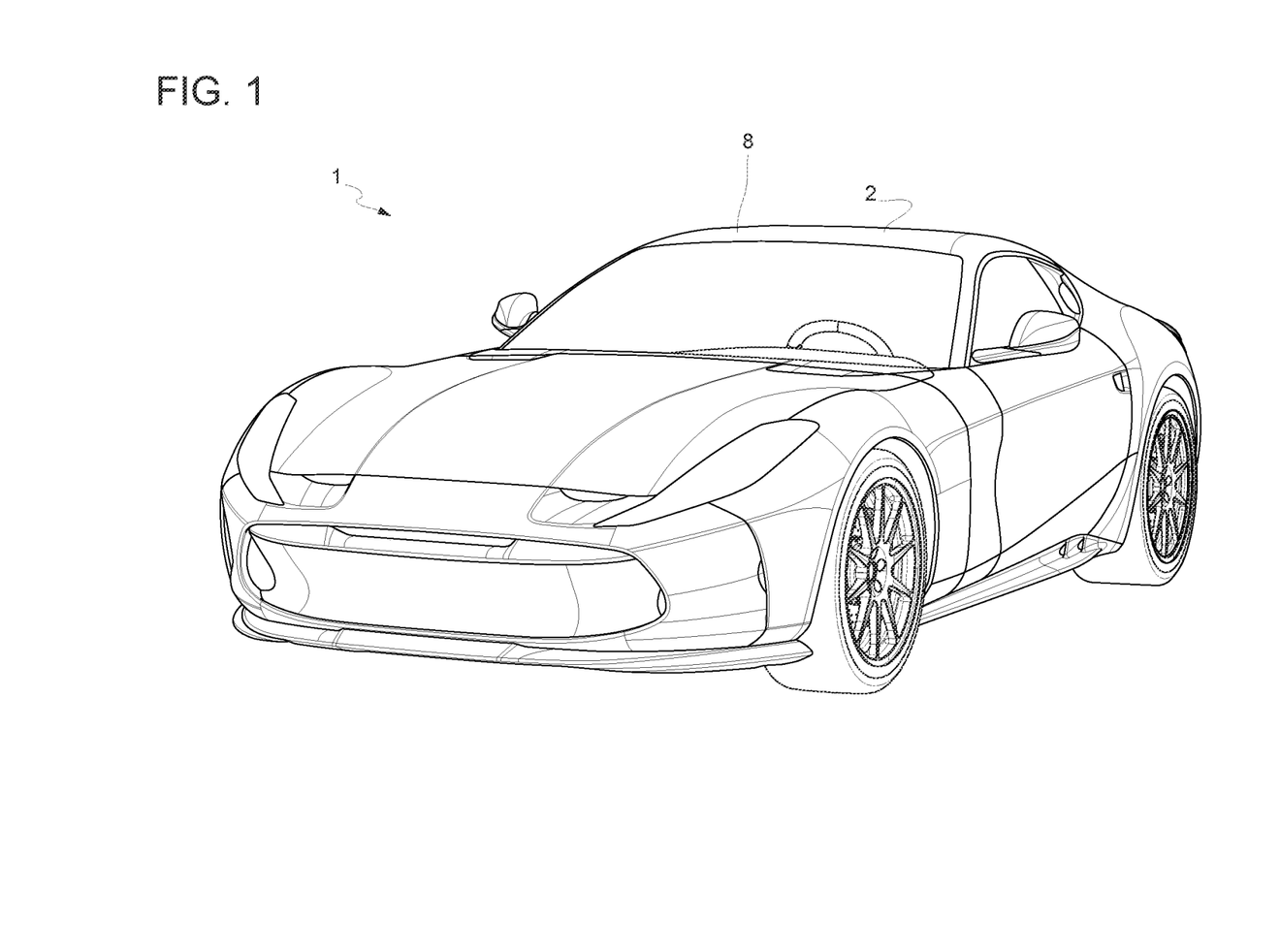
FIG. 1 is a perspective view of a motor vehicle according to the invention.

In FIG. 1, reference number 1 is used to indicate a motor vehicle as a whole.

Figure 2:
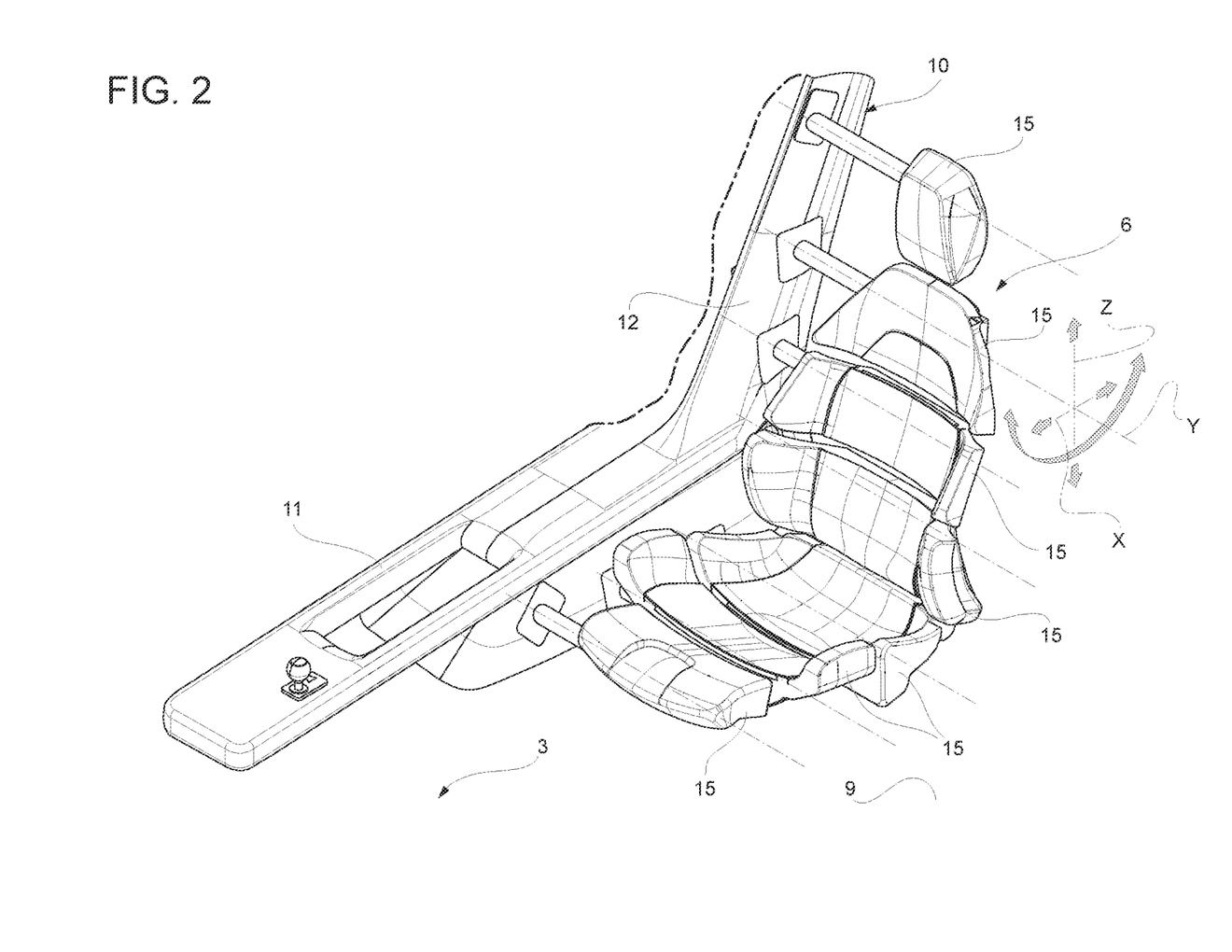
FIG. 2 is a perspective view, on an enlarged scale, of a passenger compartment of the motor vehicle in FIG. 1 containing an adjustable seat assembly.
Figure 3:
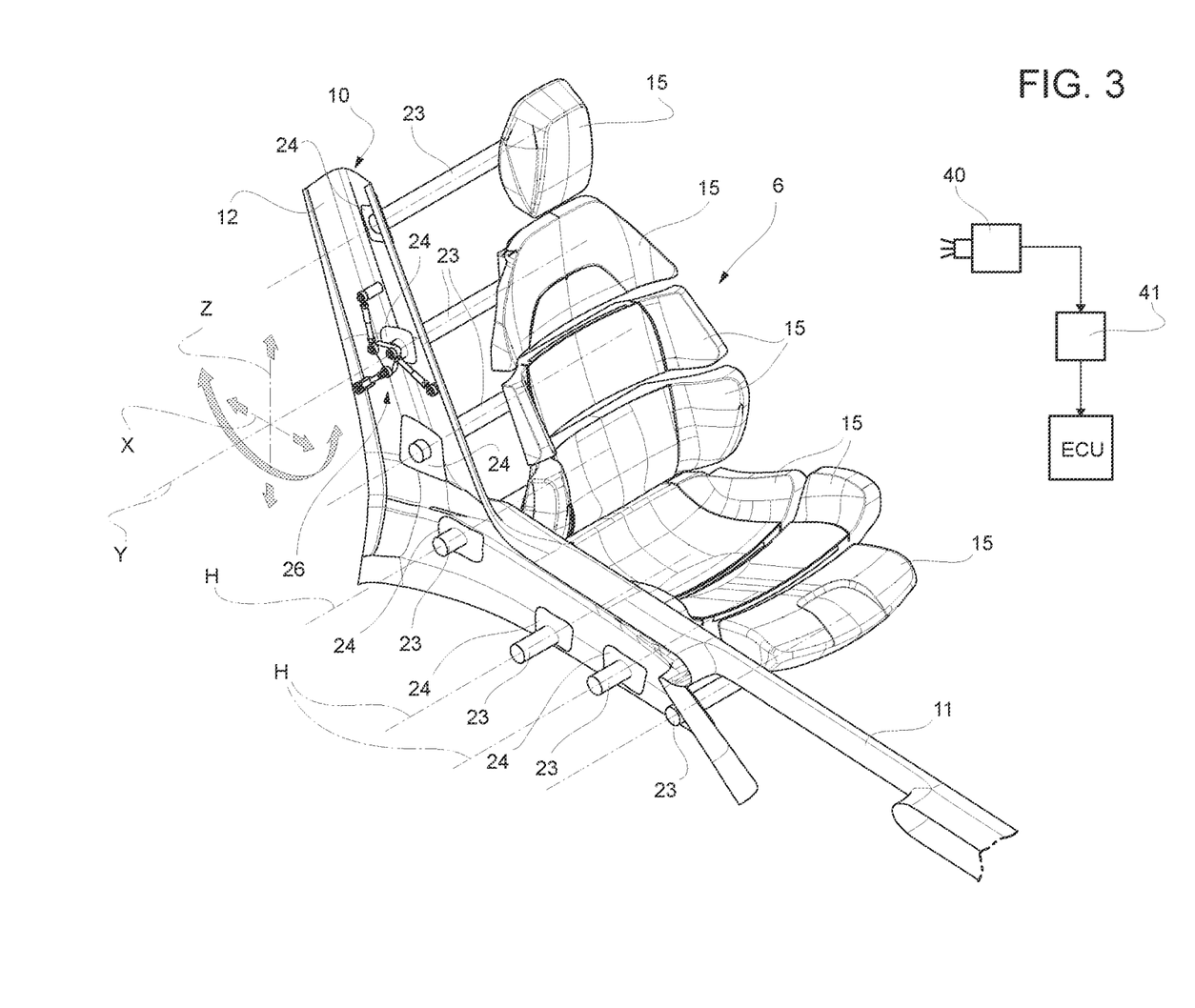
FIG. 3 shows the adjustable seat assembly, with parts removed for clarity, from the opposite perspective to FIG. 2.

The motor vehicle 1 has a forward direction or longitudinal direction, indicated in FIG. 2 by an axis X, also known as the roll axis of the motor vehicle 1.

The drawings also show two other axes Y, Z of the motor vehicle 1, also known as the pitch axis and yaw axis of the motor vehicle 1.

The axis Y is a horizontal axis orthogonal to the forward direction of the motor vehicle 1, i.e., orthogonal to the axis X. The axis Z is orthogonal to the axes X, Y and has at least one vertical component. In general, the axis Z is orthogonal to the road surface travelled by the motor vehicle 1.

The motor vehicle 1 comprises a body 2 defining a passenger compartment 3.

As well known, the body 2 includes the chassis, understood as the structural part of the motor vehicle 1, and the bodywork, that is, the part aesthetically visible from the outside of the motor vehicle 1.

In particular, the body 2 comprises a roof 8 and a floor 9, more specifically defining a top cover and a floor, respectively, of the passenger compartment 3.

Figure 7:
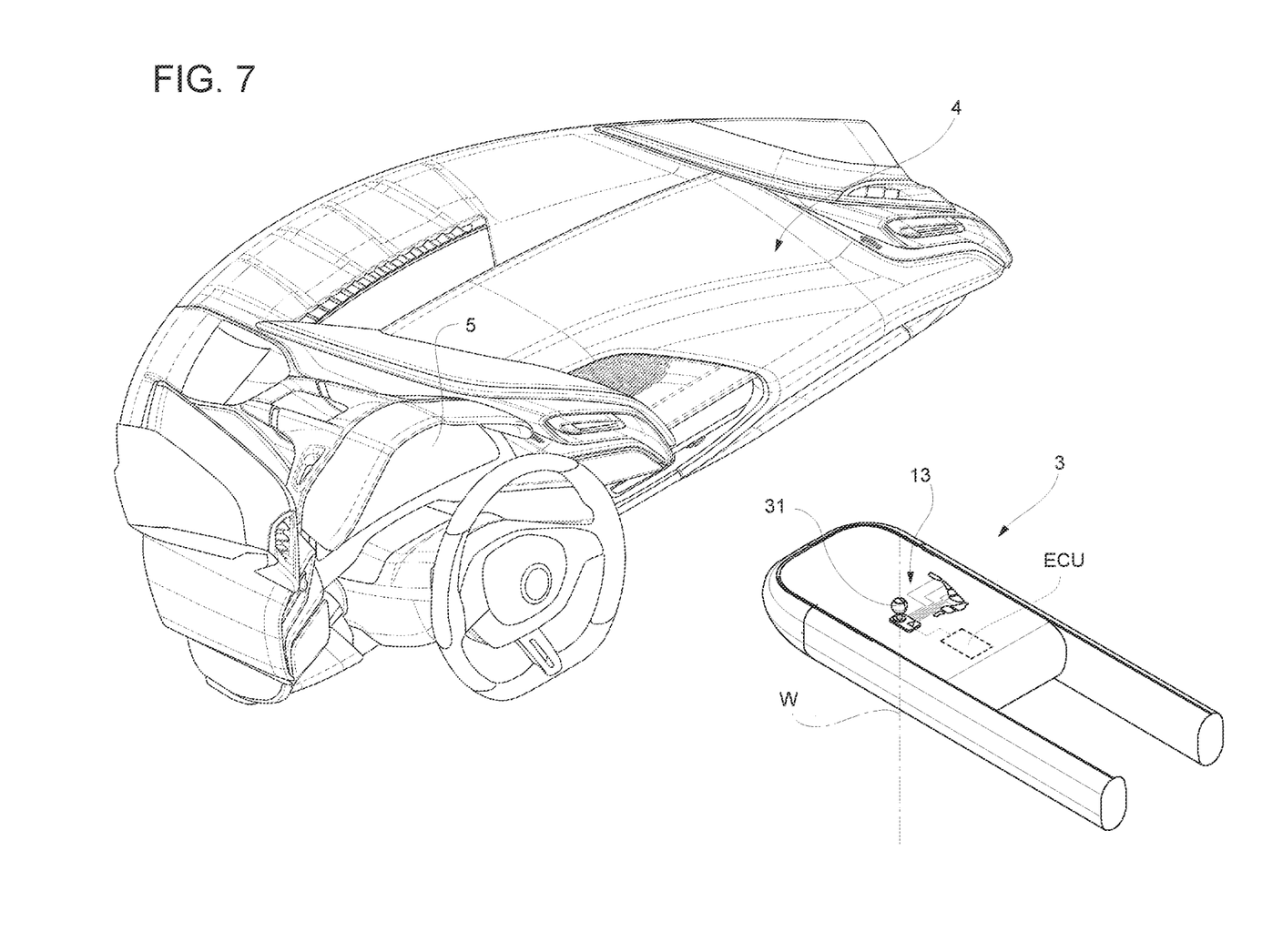
FIG. 7 is a perspective view, from the inside, of a dashboard of the motor vehicle in FIG. 1.

With reference to FIG. 7, the motor vehicle 1, inside the passenger compartment 3, comprises a dashboard 4, for example including an instrument panel 5.

Figure 6:
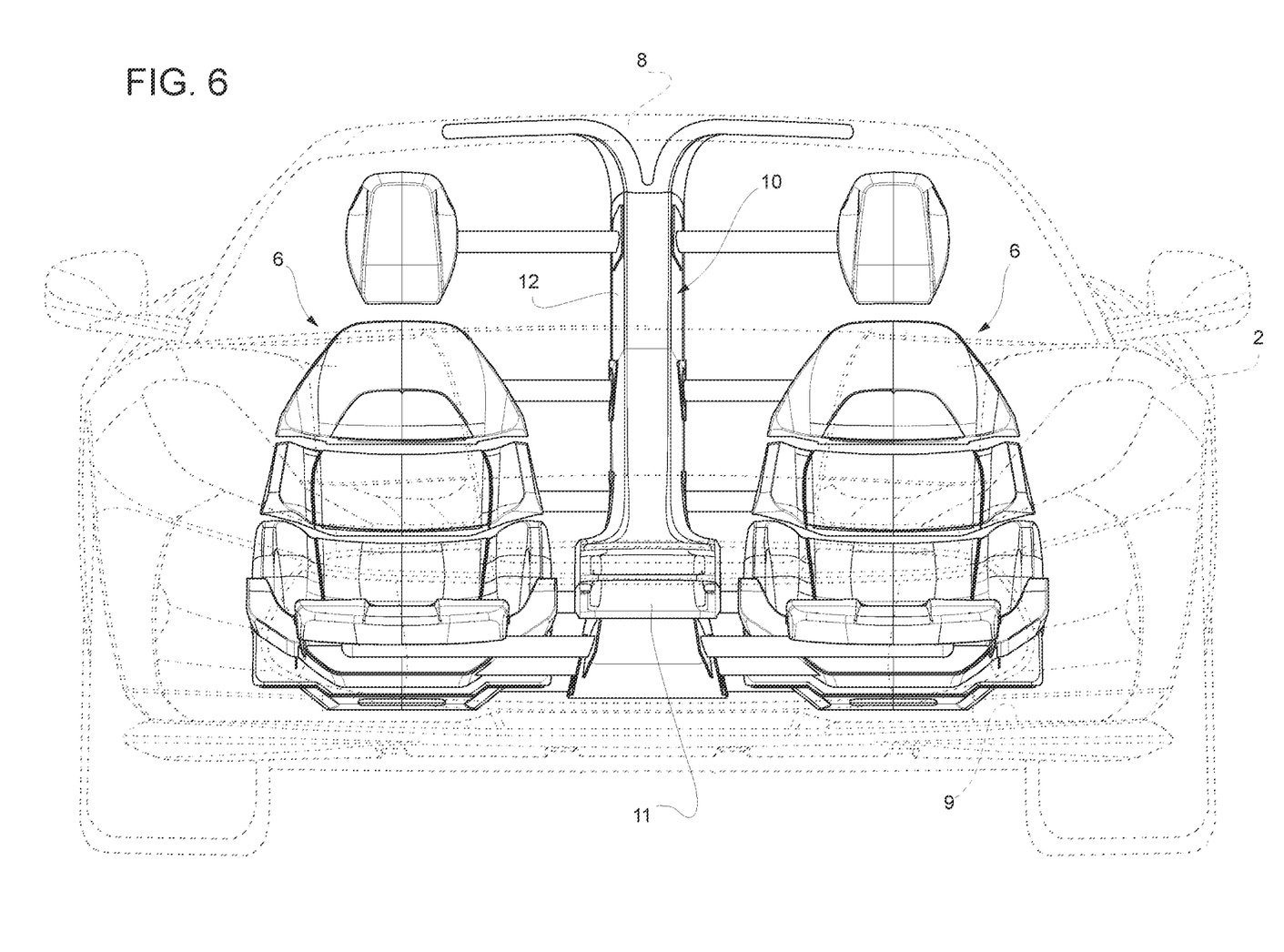
FIG. 6 is a front view of the motor vehicle in FIG. 1.

In addition, with reference to FIG. 6, the motor vehicle 1, inside the passenger compartment 3, comprises a pair of seats 6, one of which is for a driver and the other for a passenger of the motor vehicle 1.

The seats 6 are each arranged next to the lateral ends or sides of the motor vehicle 1, i.e., the ends according to the axis Y.

Moreover, the motor vehicle 1, inside the passenger compartment 3, comprises a pillar 10 located in an intermediate position between the lateral ends of the motor vehicle 1 according to the axis Y. In particular, the pillar 10 is a central pillar.

The pillar 10 is fixed in relation to the body 2 or can also be considered as an integral part of the body 2.

In greater detail, the pillar 10 extends between the floor 9 and the roof 8, in particular from the floor 9 to the roof 8; in addition, independently of this, the pillar 10 is arranged between the seats 6 according to the axis Y.

In the case shown in the attached figures, the pillar 10 has a base portion 11 extending along the axis X and a top portion 12 extending from the base portion 11 towards the roof 8, for example up to the roof 8. More precisely, the upper portion 12 forks towards the roof 8 from the base portion 11.

In particular, as shown in FIG. 7, the motor vehicle 1 comprises a control device 13 at the base portion 11. The control device 13 can be operated by a user, such as the passenger or driver, to adjust the configuration of at least one of the seats 6, as will be clearer below.

The control device 13 could have had a different location; for example, the control device 13 could have been arranged at the dashboard 4.

The seats 6 are preferably identical, so the following description will refer to only one of the seats 6, in particular the driver seat, since all the features described will also be applicable to the other seat 6.

The seat 6 comprises a plurality of separate and independent seat portions 15.

Each one of the portions 15 is configured to support a part of the user's body.

Moreover, as a whole, the seat portions 15 make up, in particular, the seat 6.

For example, one of the portions 15 defines or is part of a headrest; alternatively or additionally, some of the portions 15 define or are part of a backrest of the seat 6; alternatively or additionally, some of the portions 15 define or are part of a base portion of the seat 6, where the base portion serves to support the lower limbs of the user.

In FIG. 2, there are seven portions 15 in total. More generally, the portions 15 are at least four or more than two. Even more generally, the seat 6 must comprise at least two portions 15.

Each of the portions 15 is coupled to a structural element of the motor vehicle 1, in this case to the pillar 10, in a movable manner relative thereto with at least three degrees of freedom, or more precisely, with exactly three degrees of freedom.

The specific example of the pillar 10 is not to be necessarily understood as limiting; on the contrary, the structural element could be different and be part, for example, of the body 2 or be an additional chassis component fixed relative to the body 2. More precisely, the structural element could be a fixed frame in relation to the body 2, for example fixed to the floor 9, and arranged in such a way as to surround the seat 6. Optionally, the frame could even be coupled in a movable manner relative to the body 2, instead of being fixed relative thereto, for example by means of a system of guides allowing the translation of the frame relative to the body 2, in particular along the axes X, Z, and one or more rotations, in particular in the plane defined by the axes X, Z.

Therefore, although the following description will refer specifically to the pillar 10, nevertheless the latter could be replaced by another suitable structural element.

Each of the portions 15 is preferably constrained to translate in a translation plane, in particular defined by the axes X, Z, by means of a corresponding guide device 16.

Figure 4:
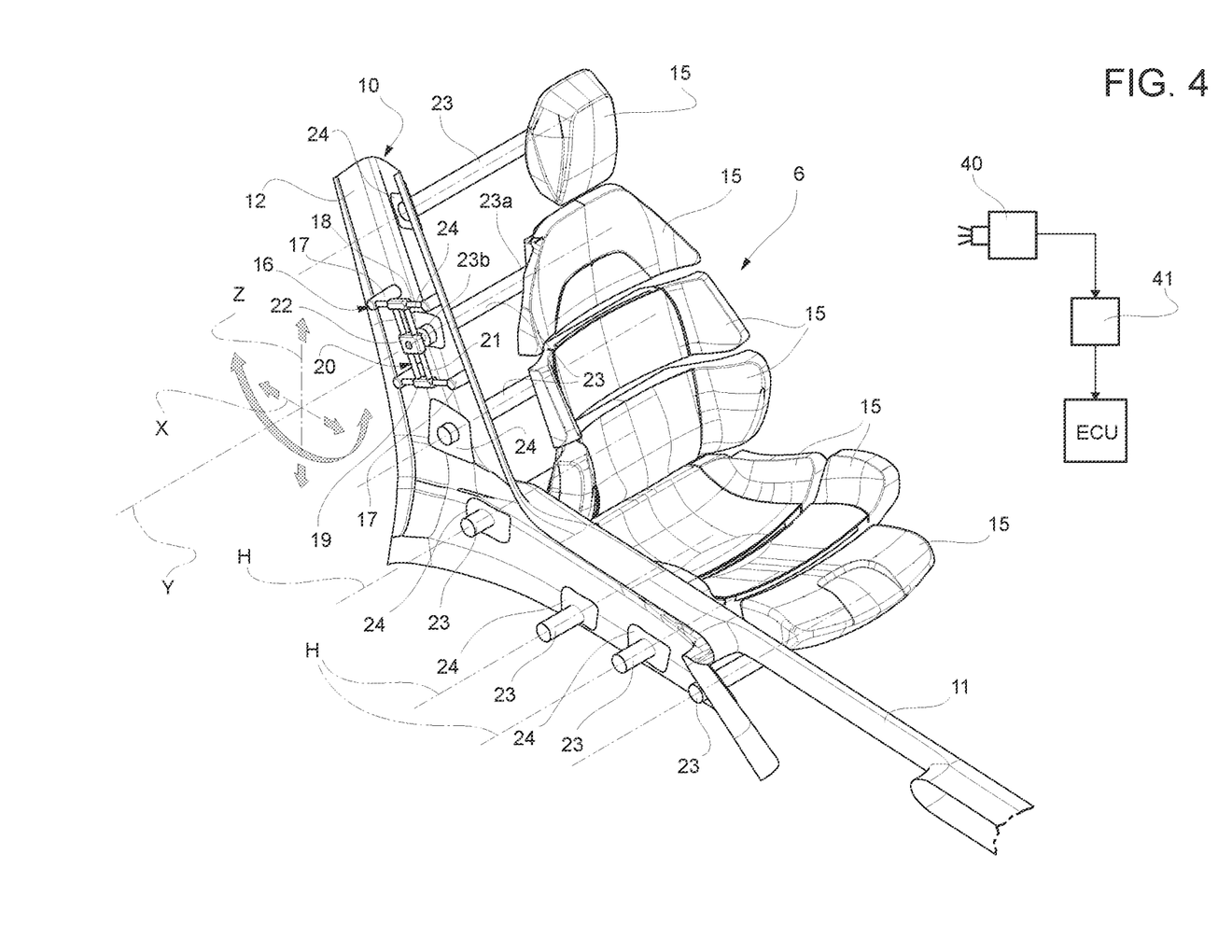
FIG. 4 is similar to FIG. 3 with the addition of a guide mechanism for a portion of the adjustable seat assembly.
Figure 5:
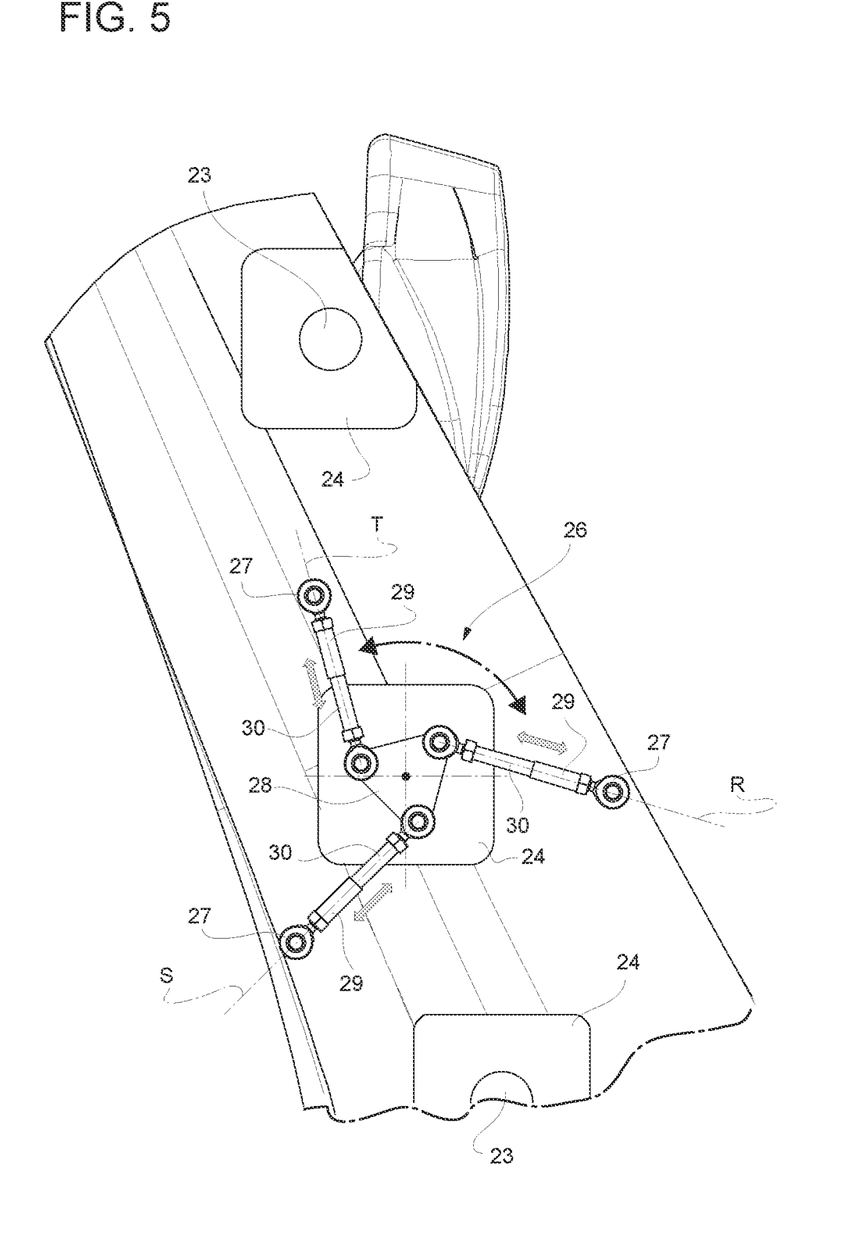
FIG. 5 is a plan view of a detail in FIG. 3.

FIG. 4 shows only one guide device 16 for the sake of simplicity, but the corresponding guide device for each of the portions 15 can be identical to the guide device 16, which is therefore the only one that is described in detail.

The guide device 16 is part of the seat 6 and is carried by the pillar 10.

In greater detail, the guide device 16 comprises a Cartesian kinematic mechanism 20 with two orthogonal axes belonging to the translation plane.

In particular, the guide device 16 comprises one or more supports 17, which are fixed in relation to the pillar 10, and a first straight guide 18 carried by the supports 17 in a fixed position in relation to the supports 17 and extending according to one of the axes of the mechanism 20.

Furthermore, the guide device 16 comprises a first slide 19 coupled to the guide 18 in a slidable manner along the guide 18. The guide 18 is configured to guide the slide 19 along one of the axes of the mechanism 20.

Moreover, the guide device 16 comprises a second straight guide 21 carried by the slide 19 in a fixed position in relation to the slide 19 and extending according to the other of the axes of the mechanism 20.

Furthermore, the seat 6 comprises a second slide 22 coupled to the guide 21 in a slidable manner along the guide 21. The guide 21 is configured to guide the slide 22 along the other of the axes of the mechanism 20. More generally, the slide 22 is functionally guided by the guide device 16 regardless of the particular constructive form of the guide device 16 itself.

Therefore, in general, the guide device 16 is configured to guide the slide 22 in the translation plane. In fact, the slide 22 is constrained to translate in the translation plane by means of the guide device 16. More precisely, the slide 22 translates along one of the axes of the mechanism 20 by sliding directly along the guide 21 and translates along the other of the axes of the mechanism 20 indirectly because the guide 21 and the slide 19 translate together along the guide 18.

Optionally, the seat portion 15 guided by the corresponding guide device 16 is coupled to the slide 22 in a pivotal manner around an axis H orthogonal to the translation plane. In this way, the seat portion 15 can rotate around the axis H and also rotate, in particular, relative to the slide 22.

Specifically, the seat 6 comprises an arm or rod 23, in particular tubular in shape, having an end 23a fixed in relation to the seat portion 15, in particular guided by the guide device 16, and an end 23b hinged to the slide 22. As will be more clearly apparent from the following, the presence of the rod 23 is independent of the presence of the guide device 16. In other words, the rod 23 could be present even if the guide device 16 were absent or structured differently, in particular with its end 23a fixed to the seat portion 15.

In the embodiment shown, the rod 23 crosses the pillar 10 parallel to the axis Y, whereby the pillar 10 has a through hole 24 along the axis Y.

The ends 23a, 23b and accordingly the slide 22 and the seat portion 15 are on opposite sides of the hole 24 and of the pillar 10, according to the axis Y.

In addition, each of the seat portions 15 is fixed to a corresponding rod 23 which, in particular, passes through a corresponding through hole 24 in the pillar 10, according to the axis Y.

In turn, each rod 23 can be hinged to a corresponding slide 22 guided by a respective guide device 16, although, for the sake of simplicity, the figures show only one slide 22 and only one guide device 16.

In general, each of the seat portions 15 moves similarly to the other seat portions 15, i.e., it has the same degrees of freedom, albeit in distinct areas of the translation plane. In this way, the seat portions 15 cannot overlap or penetrate each other.

The hole 24 delimits an area in which the corresponding seat portion 15 can translate, i.e., it sets the limits or boundaries for the translations of the corresponding seat portion 15 in the translation plane.

Conveniently, the motor vehicle 1 comprises an actuator assembly 26 for one or each of the seat portions 15, although the figures, for the sake of simplicity, show only one actuator assembly 26; the other actuator assemblies 26, for example, may be identical to the actuator assembly 26 shown. Still alternatively, the motor vehicle 1 may comprise respective actuator assemblies 26 for some of the seat portions 15.

The actuator assemblies 26 can even be considered as part of a single overall actuator assembly 26 for moving the relevant seat portions 15.

In other words, the motor vehicle 1 could comprise an actuator assembly 26 configured, as a whole, to move some or each of the seat portions 15 according to its respective degrees of freedom.

For the sake of brevity, only the actuator assembly 26 shown will be described in detail, although its features can be individually applied to other actuator assemblies, not shown.

The actuator assembly 26 can be controlled to move the corresponding seat portion 15 in the configuration space determined by the three degrees of freedom of the same seat portion 15. The configuration space is a Euclidean space of all vectors, here specifically three-dimensional, which fully and sufficiently describe the pose of the seat portion 15. Here, in particular, each vector of the configuration space is defined by two Cartesian coordinates of a point in the translation plane and by an angle of rotation around the axis orthogonal to the translation plane. Thus, each element of the vector corresponds to one of the three degrees of freedom of the seat portion 15.

In the art, although the idea of adopting the actuator assembly 26 to move the corresponding seat portion 15 is in itself innovative from a functional point of view, actuator assemblies which can structurally perform a translation in one plane plus a rotation in the same plane are many and well known.

Here, in particular, the actuator assembly 26 comprises three linear actuators 27 and a platform 28, which is fixed relative to the corresponding seat portion 15.

More specifically, the platform 28 extends parallel to the translation plane.

For example, the platform 28 is fixed to the rod 23. More precisely, the platform 28 is fitted on the rod 23; in other words, the platform 28 is drilled and crossed by the rod 23 parallel to the axis Y.

In particular, the platform 28 is arranged between the slide 22 and the pillar 10, according to the axis Y.

The linear actuators 27 can be schematised or represented as rod elements or rods that can extend in three distinct straight directions R, S, and T.

In other words, the linear actuators 27 comprise respective support bodies 29 and respective movable bodies 30 guided, respectively, by the support bodies 29 in a translational manner along the corresponding straight directions R, S, and T.

In particular, the linear actuators 27 can be electric linear actuators or more preferably hydraulic cylinders of a known type and therefore not described in detail.

Conveniently, the directions R, S, and T are coplanar with each other.

In greater detail, the support bodies 29 are hinged to the pillar 10, whereas the movable bodies 20 are hinged at three respective points of the platform 28.

Alternatively, each of the extendable rods schematising the linear actuators 27 has a first end hinged to the pillar 10 and a second end hinged to a corresponding point of the platform 28.

Therefore, the directions R, S, and T ideally rotate around the hinge points at the pillar 10.

In particular, the points of the platform 28 are arranged to ideally form the vertices of an equilateral triangle.

Furthermore, specifically, but not necessarily, when the lengths of the extendable rods, i.e., the distances between the hinge points are equal to each other, the directions R, S, and T are respectively orthogonal to the sides of the equilateral triangle.

Alternatively or additionally, the points at which the support bodies 29 or the first ends are hinged to the pillar 10 ideally form the vertices of an additional equilateral triangle.

In general, the actuator assembly 26 could also support the weight of the platform 28 and/or of the rod 23 and/or of the corresponding seat portion 15 on its own, keeping them in their current position. Hence, the guide device 16 can be considered optional, albeit advantageous. This confirms that the presence of the rod 23 is independent of the presence of the guide device 16.

Preferably, the user-operable control element 13 has a plurality of distinct configurations.

The control element 13 in each of the configurations allows the user to control a corresponding actuator assembly 26 to adjust the pose of the respective seat portion 15 in the configuration space.

Alternatively, the motor vehicle 1 may comprise a plurality of separate user-operable controls for adjusting the pose of some or all of the respective seat portions 15.

The control element 13 may be arranged in any position that the user can reach while sitting in the seat 6; for example, the control element 13 may be arranged at the dashboard 4 or at the base portion 11 of the pillar 10, as shown in FIG. 7 in a non-limiting manner.

Specifically, the control element 13 comprises a movable body 31 that can move along a straight direction W, for example parallel to the axis Z, between a plurality of positions corresponding to the configurations of the control element 13. The positions of the movable body 31 are equal in number to the seat portions 15 that can be moved by the respective actuator assemblies 26 or by the overall actuator assembly, for example formed by the actuator assemblies 26. For example, the positions of the movable body 31 are equal in number to the seat portions, namely seven.

Possibly, the control element 13 comprises a plurality of seats, not shown, along the direction W corresponding to the positions of the body 31 and to which the body 31 snap locks in the respective positions, so that it stops when it reaches the same positions, for example, due to a push or lift by the user along the direction W. In other words, the body 31 is configured to snap lock to the seats in the respective positions.

Preferably, in each of the positions or configurations, the body 31 can be moved manually along each of a bundle of directions orthogonal to the direction W, i.e., a bundle of directions forming a plane orthogonal to the direction W, and/or rotated around the direction W.

Thus, the seat portion 15 corresponding to the position or configuration of the body 31 moves by means of the respective actuator assembly 26 in accordance with the movement of the body 31.

More precisely, the control element 13 is configured to emit one or more signals relating to the movement of the body 31 in one of its positions or configurations.

Thus, the motor vehicle 1 comprises an ECU control unit configured to receive signals from the control element 13 and to control the actuator assembly 26 so that the latter moves the seat portion 15 corresponding to the position or configuration of the body 31 as a function of the movement or correspondingly to the movement of the body 31 in the same position or configuration.

In particular, the correspondence between the movement of the body 31 and the resulting movement of the seat portion 15 may be linear. That is, in other words, if the body 31 is moved along a direction orthogonal to the direction W, then the seat portion 15 will translate along a corresponding direction in the translation plane proportionally to the movement of the body 31. Also, if the body 31 is rotated around the direction W, then the seat portion 15 will rotate proportionally to the rotation of the body 31.

Conveniently, the motor vehicle 1 may further comprise a storage device, for example a memory unit of the ECU control unit, configured to store the current arrangement of the seat portions 15.

Alternatively or additionally, the motor vehicle 1 may comprise a detection device configured to detect the current arrangement of the seat portions 15.

For example, the detection device could be the ECU control unit itself; in fact, the ECU control unit knows the current arrangement of the seat portions 15 because it controls the same current arrangement via the actuator assemblies 26 or the overall actuator assembly, for example, formed by the actuator assemblies 26.

Alternatively, the detection device may comprise a camera 40 arranged so as to provide images representative of the current arrangement of the seat portions 15, and an image processing unit 41, for example forming part of the ECU control unit, configured to determine the current arrangement from the images provided by the camera 40.

Additionally, the detection device may comprise one or more position sensors for each of the seat portions 15.

Therefore, the storage device can store the current arrangement detected by the detection device.

In addition, the storage device may optionally be controllable by the user to store the current arrangement, possibly but not necessarily detected by the detection device. For example, the user may command the storage of the current arrangement via a known command, not shown, such as a key or voice command, or the like.

For the sake of clarity, the arrangement of the seat portions 15 is understood as the overall arrangement of the seat portions 15, i.e., more precisely as the set of poses, i.e., the positions and orientations of all the seat portions 15, for example relative to the pillar 10.

The motor vehicle 1 also comprises a selection device, not shown, such as an on-board computer, a keyboard, a touchpad, and the like, in particular arranged on the dashboard 4, on the base portion 11 of the pillar 10 or in any position that the user can reach. The selection device is operable by the user to select an arrangement stored by the storage device.

Actually, the storage device may not necessarily store the current arrangements of the seat portions 15 as described above, but rather it could just store one or more predefined arrangements. Moreover, the predefined arrangements may be provided to the storage device in addition to the stored current arrangements, for example detected by the detection device.

The ECU control unit is configured to control the actuator assemblies 26 or the overall actuator assembly, for example formed by the actuator assemblies 26, so as to arrange the seat portions 15 in the arrangement selected by the user by means of the selection device.

In this way, the user can save his or her favourite arrangements and then set them using the selection device at the most convenient time.

In addition, the motor vehicle 1 preferably comprises a detection device, for example including the camera 40 and the image processing device 41, to detect a posture of the user in the seat 6.

For example, the image processing device may compare the images of the user's posture from the camera 40 with a postural model in order to determine, for example by means of artificial intelligence algorithms, the user's posture.

Therefore, the ECU control unit is configured to control the actuator assemblies 26 or the overall actuator assembly, for example formed by the actuator assemblies 26, so as to arrange the seat portions 15 according to an arrangement corresponding or adapted to the detected posture.

For example, the ECU control unit can store a mapping, for example in the form of interpolable tables, which links the arrangements of the seat portions 15 to the postures that can be assumed by the user.

In this way, the arrangement of the seat portions 15 would automatically adapt in real time to the posture of the user in the seat 6.

The advantages of the motor vehicle 1 according to the invention are clear from the foregoing.

In fact, the seat 6 can be adjusted in an extremely versatile way, up to fully adapting to every possible posture chosen by the user.

The seat portions 15 are completely independent of each other and can each move with three degrees of freedom. In this way, the possible arrangements of the seat portions 15 are manifold. Therefore, the level of customization of the configuration of the seat 6 is high.

Moreover, although the seat 6 is divided into the multiple independent seat portions 15, the overall dimensions of the seat 6 remain substantially unchanged compared to the traditional solutions.

Furthermore, the components for moving the seat portions 15 are simple and readily available on the market.

Lastly, it is clear that modifications and variations may be made to the motor vehicle 1 according to the invention, without however departing from the scope of protection defined by the claims.

The invention claimed is:

1. A motor vehicle (1) comprising a structural element (10) and a seat (6) comprising at least two separate and independent seat portions (15), each of the seat portions (15) being configured to support a part of a user's body and being independently coupled to the structural element (10) in a movable manner relative to the structural element (10) with three degrees of freedom including two translations in a plane along respective orthogonal axes (X, Z) and a rotation around a further axis (Y) orthogonal to said plane.

2. The motor vehicle according to claim 1, wherein said seat portions (15) are part of a backrest of the seat (6) or of a base of the seat (6) to support the user's lower limbs.

3. The motor vehicle according to claim 1, wherein said seat portions (15) are more than two.

4. The motor vehicle according to claim 1, further comprising an actuator assembly (26) configured to move one or more or each one of the seat portions (15), the actuator assembly (26) being controllable so as to move the corresponding seat portion (15) or each one of the respective seat portions (15) in the respective configuration space determined by the three degrees of freedom.

5. The motor vehicle according to claim 4, wherein the actuator assembly (26) comprises three linear actuators (27) and a platform (28), the platform (28) being fixed relative to one of the seat portions (15), wherein the linear actuators (27) are configured as respective rod elements respectively extendable along three coplanar and distinct straight directions (R, S, T) having first ends (29) hinged to the structural element (10) and second ends (30) hinged to respective points of the platform (28).

6. The motor vehicle according to claim 4, further comprising
a detection device (40) configured to detect a posture of the user in the seat (6),
a control device (ECU) configured to control the actuator assembly (26) so as to arrange the seat portions (15) according to an arrangement corresponding or adapted to the detected posture.

7. The motor vehicle according to claim 4, comprising a control element (13) operable by the user and having a plurality of distinct configurations, wherein the control element (13), in each one of the configurations, allows the user to control the actuator assembly (26) to adjust the pose of a respective one of the seat portions (15) in the configuration space.

8. The motor vehicle according to claim 4, further comprising:
   a detection device (40) configured to detect a current arrangement of the seat portions (15),
   a storage device (ECU) controllable by the user to store the detected current arrangement,
   a selection device operable by the user to select a further arrangement of the seat portions (15) among one or more arrangements stored by the storage device (ECU), and
   a control unit (ECU) configured to control the actuator assembly (26) so as to arrange the seat portions (15) in the further arrangement selected by the user by means of the selection device.

9. The motor vehicle according to claim 1, wherein the structural element (10) is a pillar located inside a passenger compartment (3) of the motor vehicle (1) in an intermediate position relative to opposite side ends of the motor vehicle (1).

10. The motor vehicle according to claim 1, wherein the seat (6) comprises a slide (22) and a guide device (16) carried by the structural element (10) and configured to guide the slide (22) in said plane, and wherein one of the seat portions (15) is coupled to the slide (22) in a pivotal manner around said further axis (Y).

11. The motor vehicle according to claim 1, further comprising a body (2), wherein the structural element (10) is part of the body (2) or is fixed relative to the body (2).

* * * * *